US007904877B2

(12) United States Patent
Multerer et al.

(10) Patent No.: US 7,904,877 B2
(45) Date of Patent: Mar. 8, 2011

(54) SYSTEMS AND METHODS FOR AN EXTENSIVE CONTENT BUILD PIPELINE

(75) Inventors: Boyd Cannon Multerer, Seattle, WA (US); Frank F. Savage, Redmond, WA (US); Josefa M. G. Nalewabau, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 11/078,936

(22) Filed: Mar. 9, 2005

(65) Prior Publication Data

US 2006/0206596 A1 Sep. 14, 2006

(51) Int. Cl.
*G06F 9/45* (2006.01)

(52) U.S. Cl. ........................................ 717/106; 717/136

(58) Field of Classification Search ........................ None
See application file for complete search history.

(56) References Cited

U.S. PATENT DOCUMENTS

| | | | | |
|---|---|---|---|---|
| 5,659,793 | A * | 8/1997 | Escobar et al. | 715/202 |
| 6,061,696 | A * | 5/2000 | Lee et al. | 715/209 |
| 6,226,785 | B1 * | 5/2001 | Peterson et al. | 717/106 |
| 6,549,922 | B1 * | 4/2003 | Srivastava et al. | 707/205 |
| 2003/0110234 | A1 * | 6/2003 | Egli et al. | 709/217 |
| 2004/0153968 | A1 * | 8/2004 | Ching et al. | 715/513 |

FOREIGN PATENT DOCUMENTS

WO WO 2004/051396 A2 6/2004

OTHER PUBLICATIONS

Hall et al, Specifying the Deployable Software Description Formal in XML, CU-SERL-207-99, Mar. 31, 1999, pp. 1-17, Retrieved on [Oct. 21, 2010], Retrived from the Internet:URL<http://citeseerx.ist.psu.edu/viewdoc/download?doi=10.1.1.40.8500&rep=rep1&type=pdf>.*

Beck et al, Toward a Scalable Architecture for Logistical Management of Active Content, Proceedings of the International ConferenceParallel Processing Workshops, 2002, pp. 473-479, Retrieved on [Oct. 21, 2010], Retrieved from the Internet:URL<http://ieeexplore.ieee.org/stamp/stamp.jsp?tp=&arnumber=1039768>.*

Carter, B., "The Game Asset Pipeline: Managing Asset Processing", http://gamasutra.com, Feb. 21, 2005, 10 pages, XP-002391523.

Keith, C., "From the Ground Up: Creating a Core Technology Group", http://gamasutra.com, Aug. 1, 2003, 7 pages, XP-002391524.

Curtis, K. et al., "Multimedia Content Management-Provision of Validation and Personalisation Services", *IEEE Comput. Soc.*, 1999, 2, 302-306, XP010519403.

Phan, T. et al., "An Extensible and Scalable Content Adaptation Pipeline Architecture to Support Heterogeneous Clients", *Proceedings of the 22nd International Conference on Distributed Computing Systems*, 2002, 455-464, XP010595573.

* cited by examiner

*Primary Examiner* — Tuan Q Dam
*Assistant Examiner* — Cheneca Smith
(74) *Attorney, Agent, or Firm* — Woodcock Washburn LLP

(57) ABSTRACT

Systems and methods are provided for an extensive content build pipeline. The exemplary content build pipeline is based on a code build process using a standard XIF file format containing reference to game content produced using various game content editors and tools. This standardized file format is capable of containing the information required by the content build as metadata, thus enabling a standard content build pipeline. This is opposed to being based on a number of game-specific formats and thus requiring the use of exporters. However, game engine developers can then optimize the XIF files to their particular game engine format.

20 Claims, 8 Drawing Sheets

SYSTEMS AND METHODS FOR AN EXTENSIVE CONTENT BUILD PIPELINE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

This invention relates to software development. More particularly, this invention relates to development, integration, and compilation of content for interactive multimedia software such as computer games.

BACKGROUND OF THE INVENTION

The driving force behind computer games is swinging towards the game content itself: level design, 3D models, sounds, animations, cinematics, textures, game scripts (how the game behaves), etc. Game content will also continue getting larger and more complex. This also applies to any interactive multimedia application. A successful game needs to provide top-notch content, and the best way to provide it is to optimize the content pipeline so that artists and designers can create, preview, add, and tweak new assets as easily and rapidly as possible.

The content pipeline is the path that all the game assets follow, from conception until they can be loaded in the game. Game assets (or content) include everything that is not code: models, textures, materials, sounds, animations, cinematics, scripts, etc. During their trip through the pipeline, assets might be converted, optimized, chopped to bits, or combined. In the end, the asset is in a format that will be shipped with the final version of the game.

The first issue to consider when defining the content pipeline is its efficiency. With large teams of artists and designers constantly creating and tweaking game content, the content pipeline becomes a critical path. A slight inefficiency in the pipeline can easily cost a company thousands of wasted man-hours during the course of a project. Alternatively, if the content creators don't preview their work as frequently, the overall quality of the game will suffer.

The other main point to consider is robustness. If the content pipeline breaks, it can quickly jeopardize the whole project. One cannot afford to have 30 idle people waiting for the pipeline to be fixed, or working around it and consequently losing half their work. Whatever happens, the pipeline must always work correctly.

What a content build pipeline looks like often depends on the project. On one extreme, in some projects the pipeline is minimal and informal: assets are exported from their tool and loaded directly in the game. While that might be sufficient for simple games, it usually doesn't hold up well in large projects. A few other considerations are: Where are the files stored so multiple people can work on them? How are assets for multiple platforms dealt with? How can the format of the resources be changed easily? How can any extra processing be applied to them?

On the other end of the spectrum, pipelines can be very deep and elaborate. A major problem with formalizing current content build systems for games is that they are usually based on a number of game specific file formats. Since the game engine requires a specific file format, games tailor their entire content build system to use this specific file format. Any changes to the game file format can cause significant churn in the pipeline and thereby cause turnaround time to suffer significantly.

In this regard, there is a need for a system and method that provides a more efficient, robust, extensible and standardized content build process.

SUMMARY OF THE INVENTION

In consideration of the above-identified shortcomings of the art, the invention provides systems and methods for an extensive content build pipeline. A method is provided for enabling a software build for content of an interactive multimedia software application. The method comprises creating at least one file according to a standardized file format containing information related to said content, wherein said information is that which is necessary to perform a software build of said content for a plurality of different interactive multimedia software applications that use the same said content. Also, the build for content of an interactive multimedia software application puts the content into formats specific to each of the plurality of interactive multimedia software applications such that it can be accepted by each of the plurality of interactive multimedia software applications. Further, the content may be transformed, using said information in the standardized file format related to said content, into at least one format which is optimized for at least one of the plurality of interactive multimedia software applications. Other advantages and features of the invention are described below.

BRIEF DESCRIPTION OF THE DRAWINGS

The systems and methods for navigation of a graphical user environment are further described with reference to the accompanying drawings in which.

DETAILED DESCRIPTION OF ILLUSTRATIVE EMBODIMENTS

Figure 1:
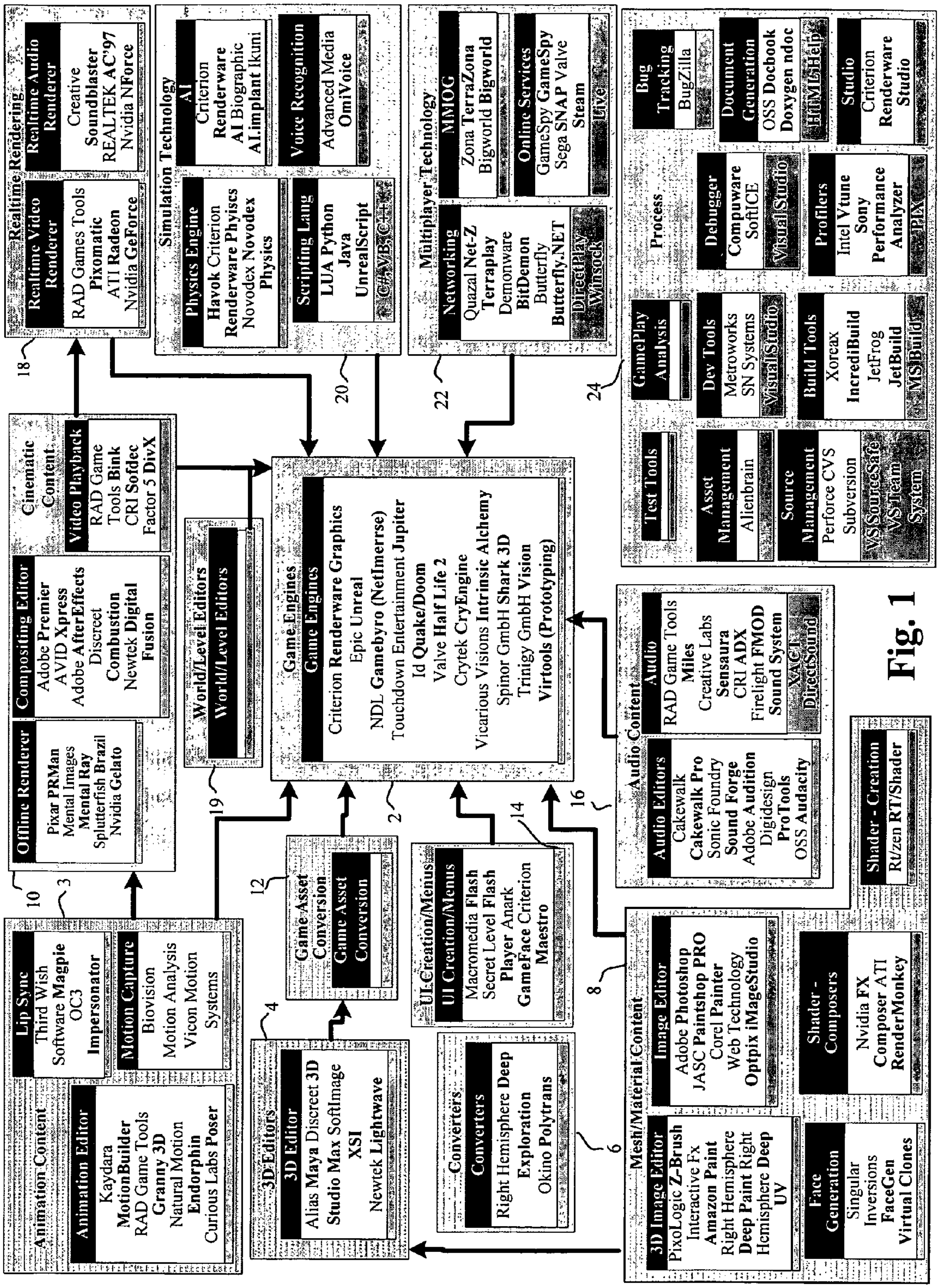
FIG. 1 is a block diagram illustrating as an example various content development editors and game development tools and their association with each other and various game engines.

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview

Systems and methods are provided for an extensive content build pipeline. The exemplary content build pipeline is based on a code build process using a standard XIF file format containing metadata associated with and referring to game content produced using various game content editors and tools. The metadata may, for example, contain the routing, context, and appropriate reading mechanism for the various binary content files and thus the standard XIF file need not necessarily contain the binary content data itself. Since this standardized file format is capable of containing the information required by the content build, it enables a standard content build pipeline. This is opposed to being based on a number of game-specific formats. However, game engine developers can then optimize the XIF files to their particular game engine format.

First, a description is given of various content development editors and game development tools and their association with each other and various game engines along with an explanation of how content builds are typically performed currently based on a number of game-specific formats using an "export" process. This appears in the section below "Game Content and a Typical Build Pipeline." Second, an explanation and example is provided in the section "Extensive Content Build Pipeline and the Standardized File Format" of an extensive content build pipeline and the standardized file format it utilizes to enable a standard content build pipeline for various game engines. Third, two alternative embodiments are described in the section "Alternative Embodiments" in which the standard content pipeline is branched at the beginning of the pipeline to provide specific pipelines that re-use or leave out certain transformers for specific needs. Finally, a description of a computing and networked environment is provided which will be recognized as generally suitable for use in connection with the systems and methods set forth herein. Because the material in the figures corresponding to the exemplary computing and networked environment is generally for exemplary purposes, the corresponding description is reserved for the end of this specification, in the section entitled "Exemplary Computing and Network Environment."

Game Content and a Typical Build Pipeline

Referring first to FIG. 1, shown is a block diagram illustrating as an example various content development editors and game development tools and their association with each other and various game engines.

Although reference is made for exemplary purposes to "games" and "game content." The content and build processes described herein need not be limited to traditional video game applications, but are applicable to any interactive multimedia programs or applications. Therefore, "game" is defined as any interactive multimedia program or application in a computing environment.

Shown is a block representing various game engines 2 and various blocks representing content creation tools, editors and build tools for games. These include animation content tools 3, 3D editors 4, converters 6, mesh/material content 8, cinematic content tools 10, game asset conversion tools 12, User Interface (UI) creation/menu tools 14, audio content 16 tools, realtime renderers 18, world/level editors and simulation technology tools 20, multiplayer technology tools 22 and build processing tools 24. The game engines 2, for example Valve Half Life 2® or Epic Unreal® take as input the content and assets output from the various editors and tools. However, the content build process is responsible for taking this content and putting it in a format capable of being run by the game engines 2. Some content may be processed through an additional tool or editor before it is taken by the game engine through the content build process. For example, the content from a 3D editor 4 such as Alias Maya® or Discreet 3D Studio Max® may be fed to a mesh/material editor 8, say Pixologic Z-Brush® to add detail and then textures created in Adobe Photoshop® are applied. Also, from the 3D editor 4 the content may go through a game asset conversion step 12 before going through the build process and being run by the game engine 2. Likewise, for cinematic content, animation content 3 from Kaydra MotionBuilder®, or OC3 Impersonator® may be passed through a cinematic content tool such as AVID Xpress® or Pixar PRMan®. This is then compressed into a cinematic using BINK®, for example, which uses the Video Card (ATI® or NVidia®) or Pixomatic® to render the cinematics for the game engine 2.

Figure 2:
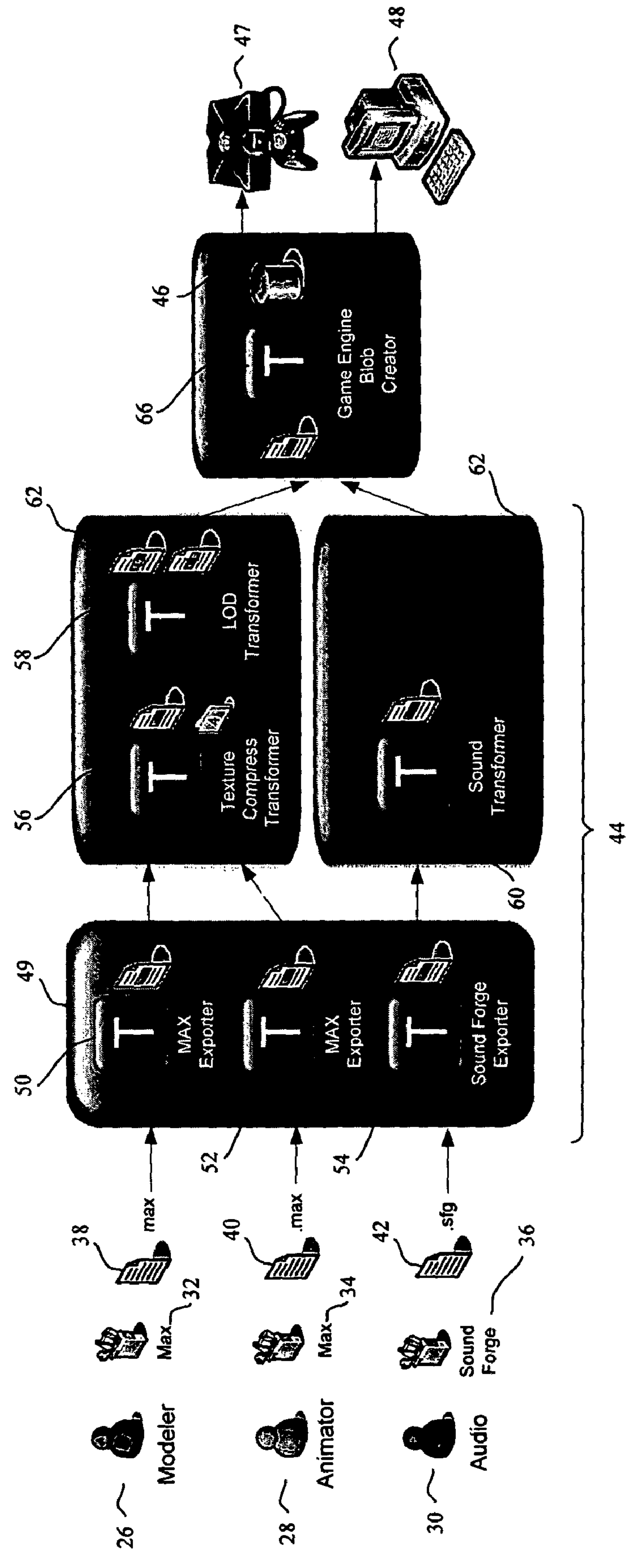
FIG. 2 is a block diagram illustrating a content build pipeline capable of building content described in FIG. 1 that requires a game specific intermediate file format and custom exporters.

Referring next to FIG. 2, shown is a block diagram illustrating a content build pipeline capable of building content described in FIG. 1 that requires a game specific intermediate file format and custom exporters. Shown as an example are content creators. A modeler 26, an animator 28, and an audio content creator 30 each create content, likely with a number of various content creation tools and editors. The modeler uses Discreet 3D Studio Max®, the animator may also use Discreet 3D Studio Max®, and the audio content creator may use Sonic Foundry SoundForge®, for example. Each content creation tool produces its own specific native file format. For example, Discreet 3D Studio Max® produces files in .max format 38, 40. The audio codec 42 also produces files in its native format and may be produced using any variety of tools using an audio codec such as Sonic Foundry SoundForge®. The build pipeline 44 is responsible for taking this content in various formats 38, 40, 42 and putting it in a format capable of being run by a particular game engine 46 to run on a particular game platform such as Microsoft Xbox® 47 or a PC running a Microsoft Windows® operating system 48, for example.

Since the game engines 46 require a specific file format, games tailor their entire content build system to use this specific file format. Any changes to the game file format can cause significant chum in the build pipeline 44. The content creators 26, 28, 30 are understandably looking to use the best tools for their job. Since these tools have their own specific file format, currently game studios need to create an "export" process 49 where they take information from the content creator tools and export the information into their game specific format. Examples of these export processes are shown in FIG. 2 as the Discreet 3D Studio Max® exporters 50, 52 and the audio codec exporter 54.

Once the game specific intermediate file format has been established, game content build systems then construct pipelines 62, 64 to actually perform the build. This involves manipulating the game specific intermediate file format produced from the exporters 50, 52, 54 individually for different content (or asset) types using transformers for each game specific format such as a texture compress transformer 56, the level of detail (LOD) transformer 58 and the sound transformer 60, for example. The transformer is essentially a piece of code that manipulates game data to prepare it for a game. The number and types of transformers vary widely and there can be any number of transformers in the build pipeline 44. Then, the game engine blob creator transformer 66 puts the content in the final input format that will be accepted by the specific game engine 46. The game engine 46 drives the specific input format which flows back to the tools 32, 34, 36. Currently, these build systems tend to be developed for each game and are usually stitched together with small utilities and lack some of the features of code builds (e.g., logging, profiling and debugging).

Extensive Content Build Pipeline and the Standardized File Format

Figure 3:
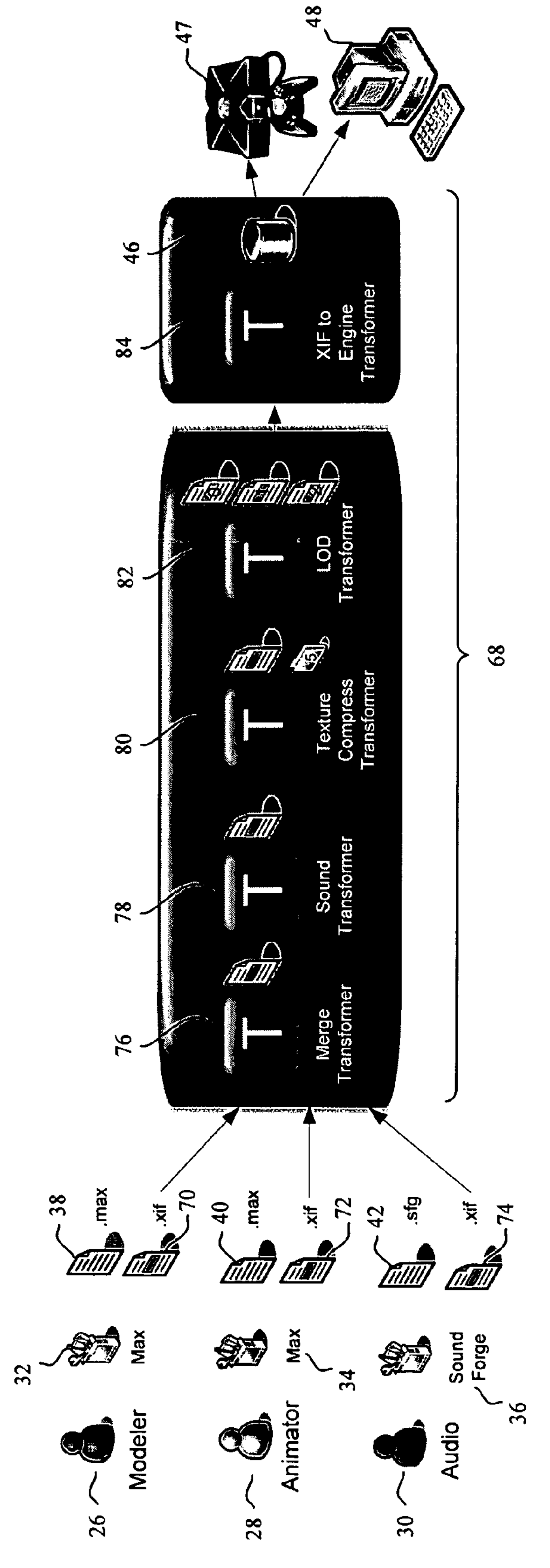
FIG. 3 is a block diagram illustrating a standardized and extensible content build pipeline capable of building content described in FIG. 1 according to the present invention.

Referring next to FIG. 3, shown is a block diagram illustrating a standardized and extensible content build pipeline capable of building content described in FIG. 1 according to the present invention. As shown in FIG. 3, the content build 68 is treated similar to a code build and eliminates some of the fragility in the current systems.

There are two major parts to the solution. First, the file format associated with the content build is standardized. This is a file format capable of containing the information required by the content build 68 so that one can create a standard content build pipeline 68. For example, among other formats, the file may be an XNA Intermediate Format (XIF) file with embedded Extensible Markup Language (XML) that has game specific schemas capable of describing major pieces of game content. Importantly, the standardized file may include metadata that refers to binary content data without necessarily including the content data within the standardized file. The metadata may, for example, contain the routing, context, and appropriate reading mechanism for the various binary content files. In this case, creators of the binary data files may provide standardized file "reading" services that enable identification of the correct processing. This standard file format allows game engine developers to optimize the creation of the game specific binary files without having to dictate the content build intermediate format. Game engine developers can concentrate on optimizing the binary format. However, note this is not replacing the native file formats 38, 40, 42 produced by the tools 32, 34, 36.

Figure 4:
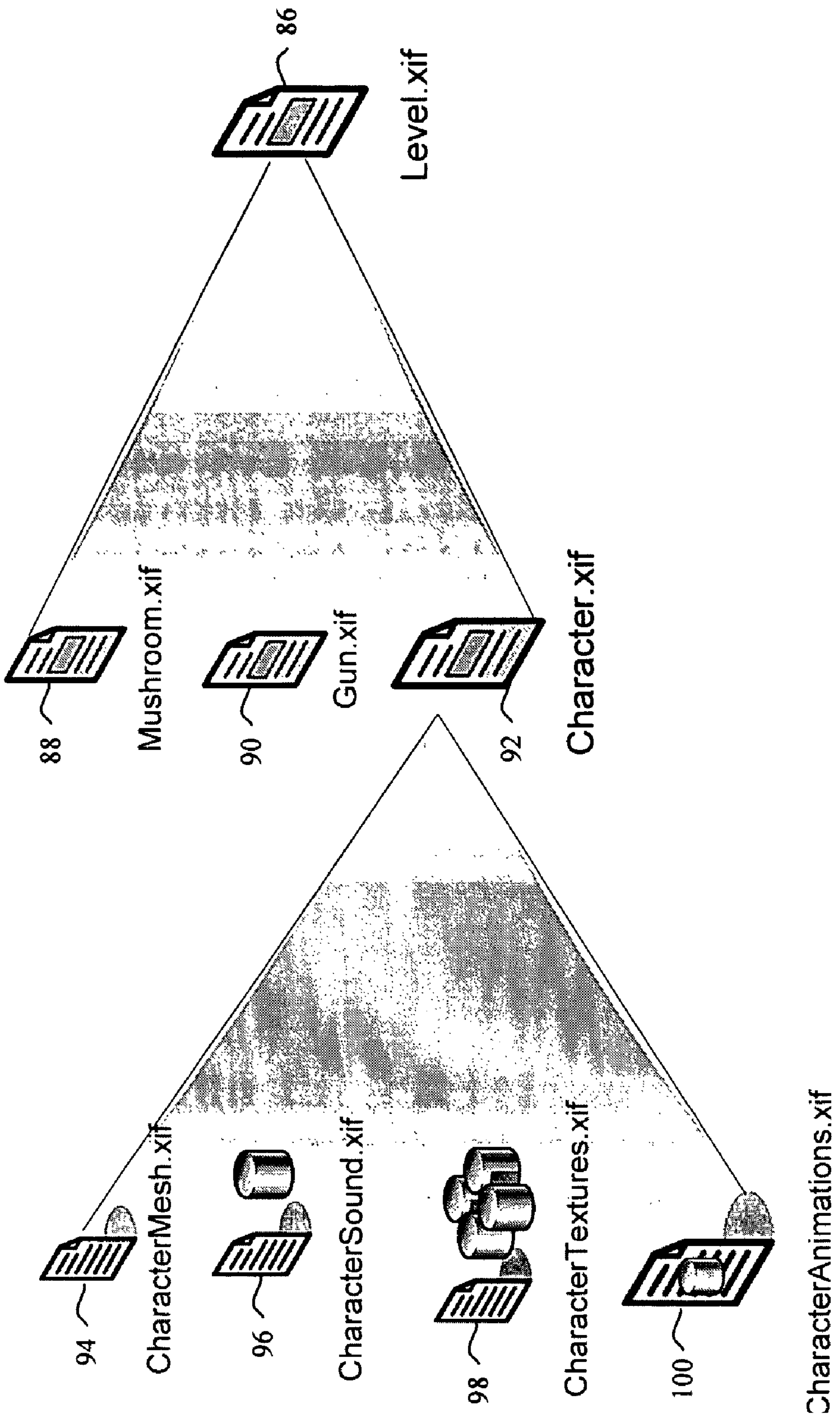
FIG. 4 is a diagram showing the architecture of a standardized file format associated with the content build pipeline of FIG. 3 according to the present invention.

Referring next to FIG. 4, shown is a diagram illustrating the architecture of a standardized file format associated with the content build pipeline of FIG. 3 according to the present invention. As an example, a standardized XIF file named Level.xif 86 is provided. However, other standardized formats than XIF may be used that have similar characteristics that enable their use in the same manner as the XIF files described herein. Level.xif, may have embedded XML (or another declarative programming language) that defines game specific schemas capable of describing major pieces of game content. These schemas for example, may be for well known game asset (content) types such as graphics, audio, etc., and are fully extensible by game developers.

Also, the XIF file may reference other XIF files containing or referring to other pieces of game content and need not actually contain the binary content data itself. In the example provided, Level.xif 86 references Mushroom.xif 88, Gun.xif 90 and Character.xif 92. These, in turn, may also reference other XIF files. For example, Character.xif 92 references CharacterMesh.xif 94, CharacterSound.xif 96, and CharacterTextures.xif 98, and CharacterAnimations.xif 100. Also, the XIF files, such as Level.xif 86, may have embedded binary files and/or reference another binary file. These references to other XIF and binary files allow for componentization, reuse and dependency checking.

The standardized XIF files, such as those shown in FIG. 4, enable game studios to not have to create specific exporters. All of the data the game studio would need is stored in the XIF format and associated binaries. These binaries may be game content like textures, which are just bitmaps, or sound wave files wherein it would not make sense to convert to text in the embedded XML file. Also, the standardized file format enables the build system to be able to refer to content "overrides," meaning that there may be a version of a piece of content for multiple platforms, but one particular platform needs a specific version individualized for that platform. The individualized version "overrides" the general one. This is expressed in the standardized file metadata.

As described above with reference to FIG. 3, the data is then transformed into a format that is ideal for the application. The work is done in the transform stage 68, as opposed to the export stage 49 of FIG. 2, since all of the data needed is in the XIF format for the game. This breaks the dependency on the specific art package and exporter and allows the developer to change these out more easily since the transform work is not part of the project.

Second, a proven code building technology is used to provide the basic infrastructure for a content build. For example, referring back to FIG. 3, a suitable code building technology that provides the basic infrastructure for the content build of FIG. 3 may be Microsoft Visual Studio® Integrated Development Environment (IDE) which includes the Microsoft MSBuild® engine. MSBuild® delivers a file format that is well documented and backed up by a published XML schema definition, making the MSBuild® engine an integral part of the .NET Framework redistributable. This allows developers to customize, augment or completely redefine the build process and provides seamless integration with the Microsoft Visual Studio® IDE.

MSBuild® has an XML-based file format that is simple to understand and easy to extend. The MSBuild® file format enables developers to fully describe what artifacts need to be built, as well as how they need to be built under different configurations. In addition, the file format enables developers to author reusable rules which can be factored into separate files so that builds can be done consistently across different projects within a product. MSBuild® is a core part of the .NET Framework redistributable. This allows developers to rely on the MSBuild® infrastructure regardless of IDE presence and licensing issues. In addition, by providing MSBuild® class libraries as a core part of the .NET Framework, developers are able to create and debug components of a customized MSBuild® process using the managed language of their choice. Third, MSBuild® is completely transparent with regards to how it processes and builds software. All build steps are explicitly expressed in the XML project file regardless of whether it was authored by hand or auto-generated by the Microsoft Visual Studio® IDE. This also means a user can understand, replicate, edit, remove, or augment any part of the build process. Finally, MSBuild® is fully integrated into the Microsoft Visual Studio® IDE. This tight integration will enable developers to take advantage of all the built-in productivity features Microsoft Visual Studio® offers, while allowing developers to scale, customize, and adapt the build system to their unique infrastructure needs. Although the Microsoft Visual Studio® IDE with the integrated MSbuild® engine is provided as an example of an IDE with suitable code building technology to provide the basic infrastructure for the content build of FIG. 3, other IDE's with similar features may also be used.

In the example provided in FIG. 3, The XIF files 70, 72 corresponding to the Discreet 3D Studio Max® content and the XIF file 74 corresponding to the Sonic Foundry Sound-Forge® content both contain game specific schemas capable of describing major pieces of game content and are input directly to a single standard pipeline 68. Notice that there is no export layer 49 required as in FIG. 2. Having a standard file format as described above means that game studios will no longer have to create specific exporters for each content creation tool they use. Importantly, game studios can move between versions of content creation tools without it affecting their build pipeline.

The single pipeline 68 includes various transformers such as the merge transformer 76, the sound transformer 78, the texture compress transformer 80, the LOD transformer 82, and finally the XIF to game engine transformer 84. These transformers 76, 78, 80, 82 process through the standardized XIF files 70, 72, 74. With the single pipeline 68, the transformers 76, 78, 80, 82 simply pass through files that they don't process. Various other transformers may be included in the pipeline and are simple to create and reuse.

Since the standardized file format provides abstraction from the content creation tools 26, 28, 30 and the game engine 46, one can then re-use an existing code build process that provides the basic build infrastructure for content such as, for example, the Microsoft Visual Studio® IDE with the MSbuild® engine. The ability to use a code build system to build game content means that one automatically receives better basic services such as logging, debugging, profiling etc.

Also, programmers are able to affect the content build. Currently, each game uses a different build system and thus game programmers have little ability or desire to change the content build because it uses different technology than a code build. Basing a content build on a code build eliminates this problem. Also, the content build pipeline 68 of FIG. 3 based on a code build system provides easier development of a transformer. Code build systems are usually built to be pluggable. Using a code build system means that new transformers can be written quickly and they can be plugged into the content build system quickly and easily. The basic build process provides a general infrastructure so it's simple to take transformers and reuse them across different pipelines (e.g., game build vs. preview build) and different games.

Alternative Embodiments

Figure 5:
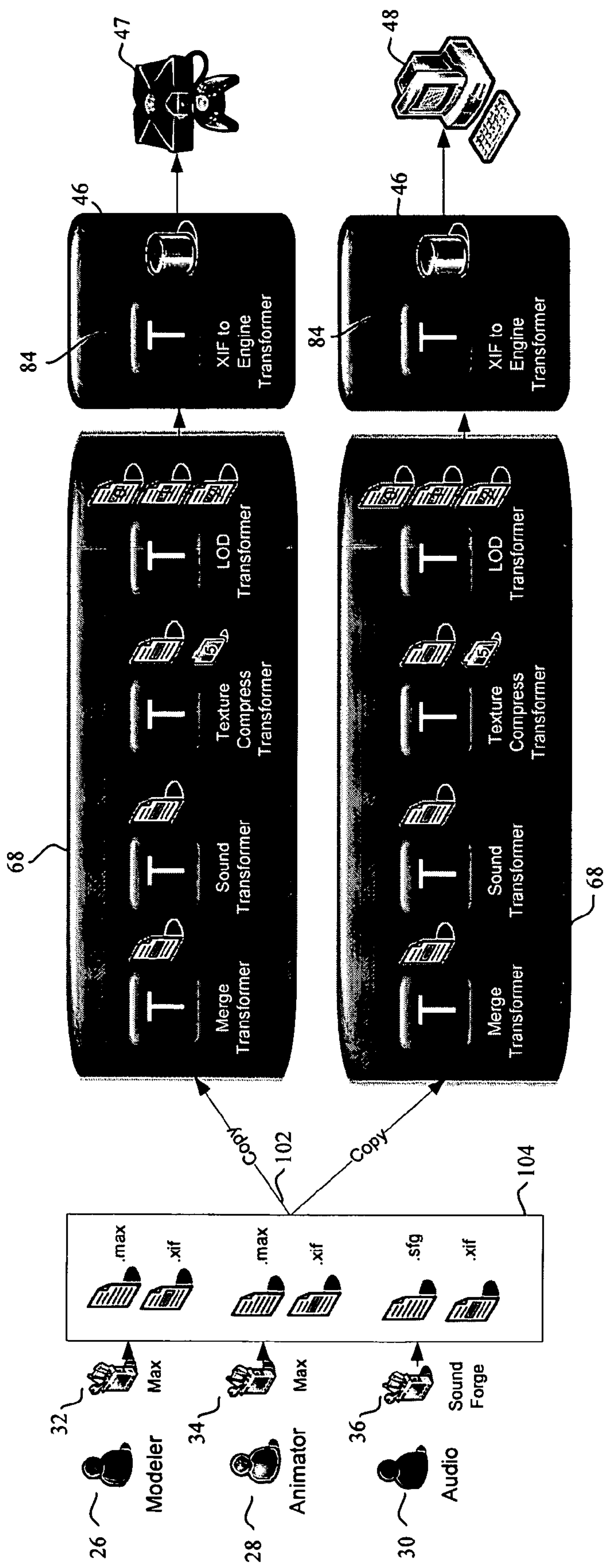
FIG. 5 is a block diagram illustrating a standardized and extensible content build pipeline that is branched at the beginning of the pipeline for different game platforms according to an alternative embodiment of the present invention.

Referring next to FIG. 5, shown is a block diagram illustrating a standardized and extensible content build pipeline that is branched at the beginning of the pipeline for different game platforms according to an alternative embodiment of the present invention. The branch occurs after the game content in native file formats and the standardized XIF files 104 are created. One or more copies 102 are made of the XIF files for each game engine 46 according to the different game platforms 47, 48. Each copy of the XIF file(s) is run through a separate standard pipeline 68 corresponding to a particular game engine 46. Even though only two copies and pipelines are shown in FIG. 5, numerous copies and pipelines may be made corresponding to numerous different types of game engines and formats.

Figure 6:
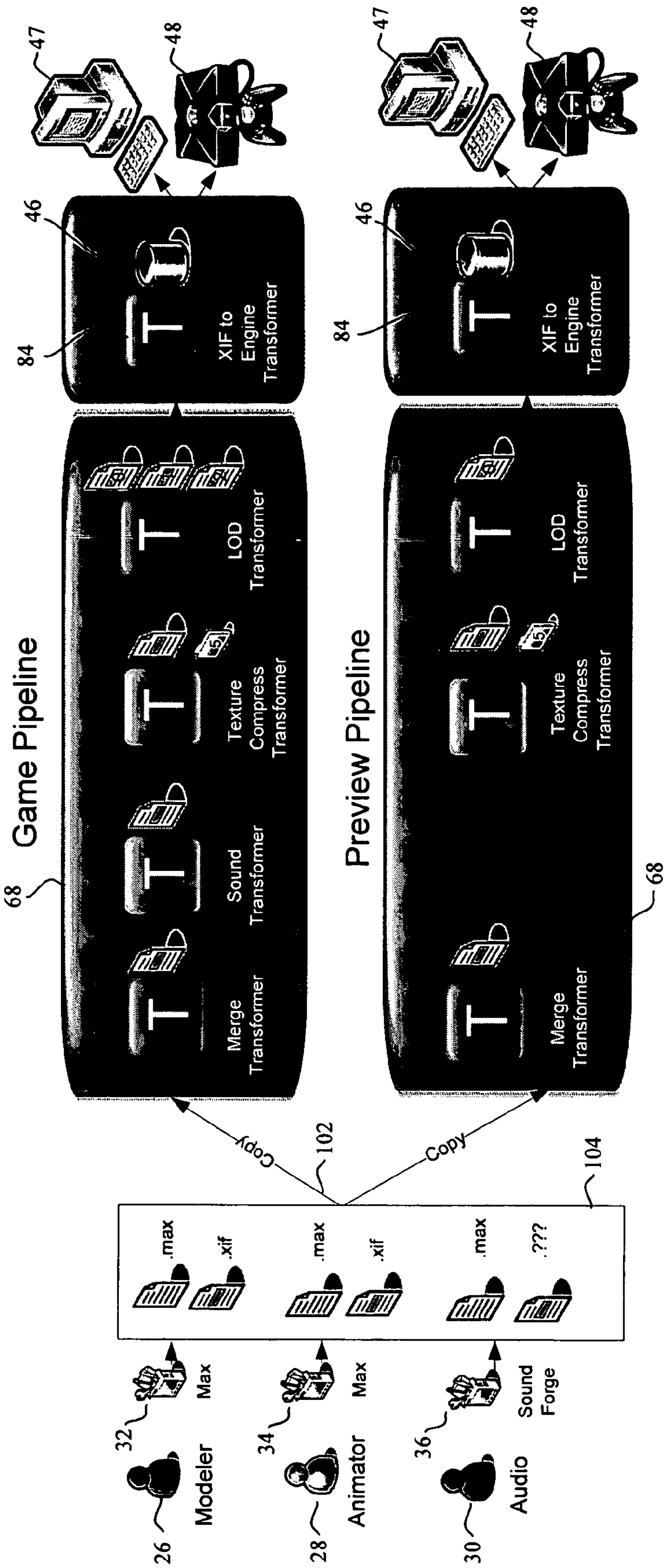
FIG. 6 is a block diagram illustrating a standardized and extensible content build pipeline that is branched at the beginning of the pipeline to create a separate preview pipeline and game pipeline according to an alternative embodiment of the present invention.

Referring next to FIG. 6, shown is a block diagram illustrating a standardized and extensible content build pipeline that is branched at the beginning of the pipeline to create a separate preview pipeline and game pipeline according to an alternative embodiment of the present invention. As in FIG. 5, a branch occurs after the game content in native file formats and the standardized XIF files 104 are created. In this case, a copy is made of the XIF files for a preview pipeline 106, which may be a limited build that does not include all of the content of a normal content build.

In the example provided in FIG. 6, the preview build 106 does not include the audio portion because for a preview the developer may, perhaps, only need or desire to preview the video content of the game. However, other aspects of the game content instead of or besides audio may also be left out for preview purposes. The XIF to engine transformer then puts the content in the final input format that will be accepted by the specific game engine. The standardized and extensible build process provides a general infrastructure so it is simple to take transformers and reuse them across different pipelines as in the preview pipeline of FIG. 6 and the separate game pipelines of FIG. 5.

Exemplary Computing and Network Environment

Figure 7:
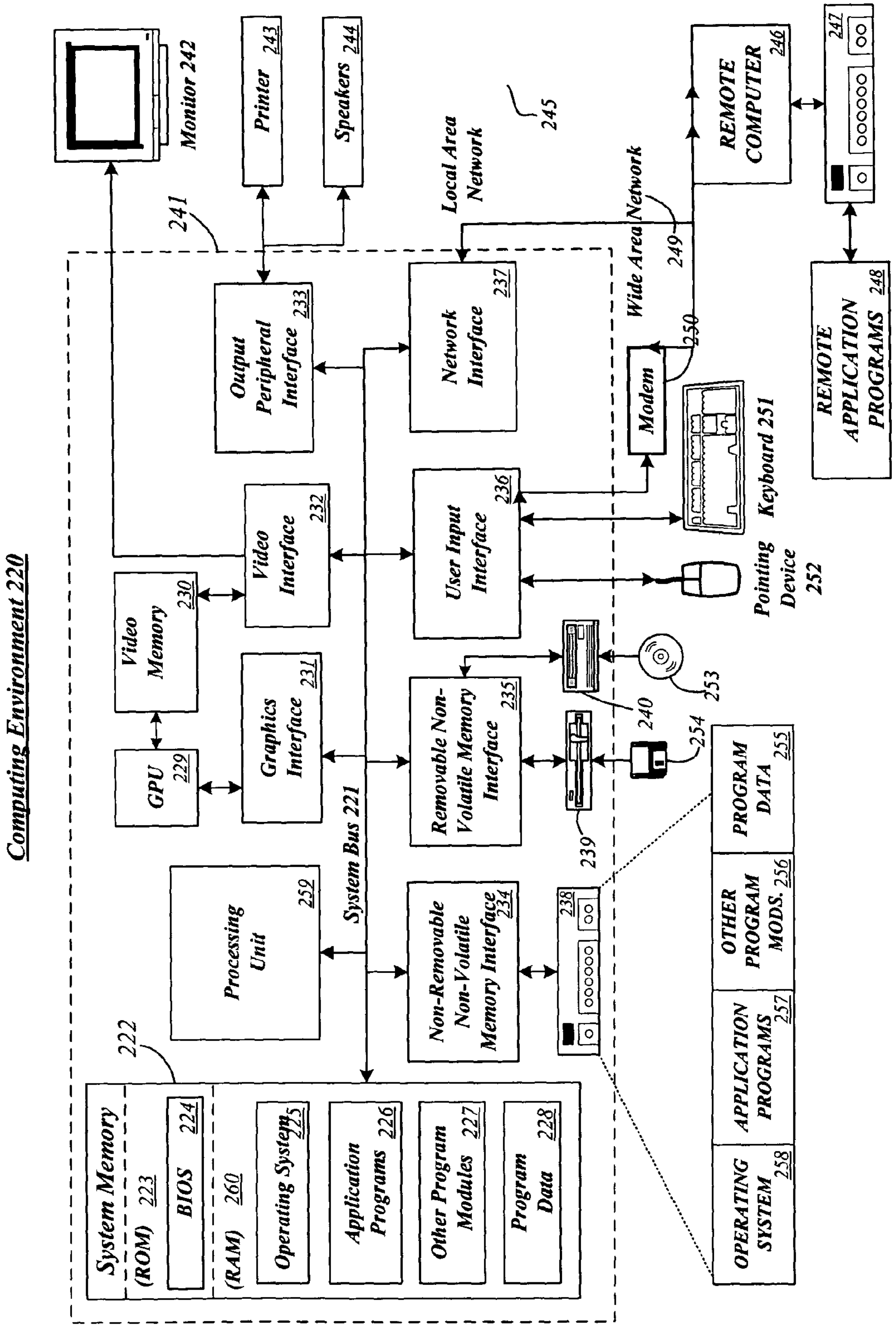
FIG. 7 is a block diagram representing an exemplary computing device suitable for use in conjunction with various aspects of the invention.

Referring to FIG. 7, shown is a block diagram representing an exemplary computing device suitable for use in conjunction with various aspects of the invention. For example, the computer executable instructions that carry out the processes and methods for performing the extensible standardized and extensible build process as described above may reside and/or be executed in such a computing environment as shown in FIG. 7. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus and PCI Express.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, including those optical mediums in Blu-ray, HD DVD, and other blue laser formats, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 7 illustrates operating system 225, application programs 226, other program modules 227, and program data 228.

The computer 241 may also include other removable/non-removable, volatile/nonvolatile computer storage media. By way of example only, FIG. 7 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 7, provide storage of computer readable instructions, data structures, program modules and other data for the computer 241. In FIG. 7, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 7. The logical connections depicted in FIG. 7 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 7 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing aspects of the invention in the context of one or more standalone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 8:
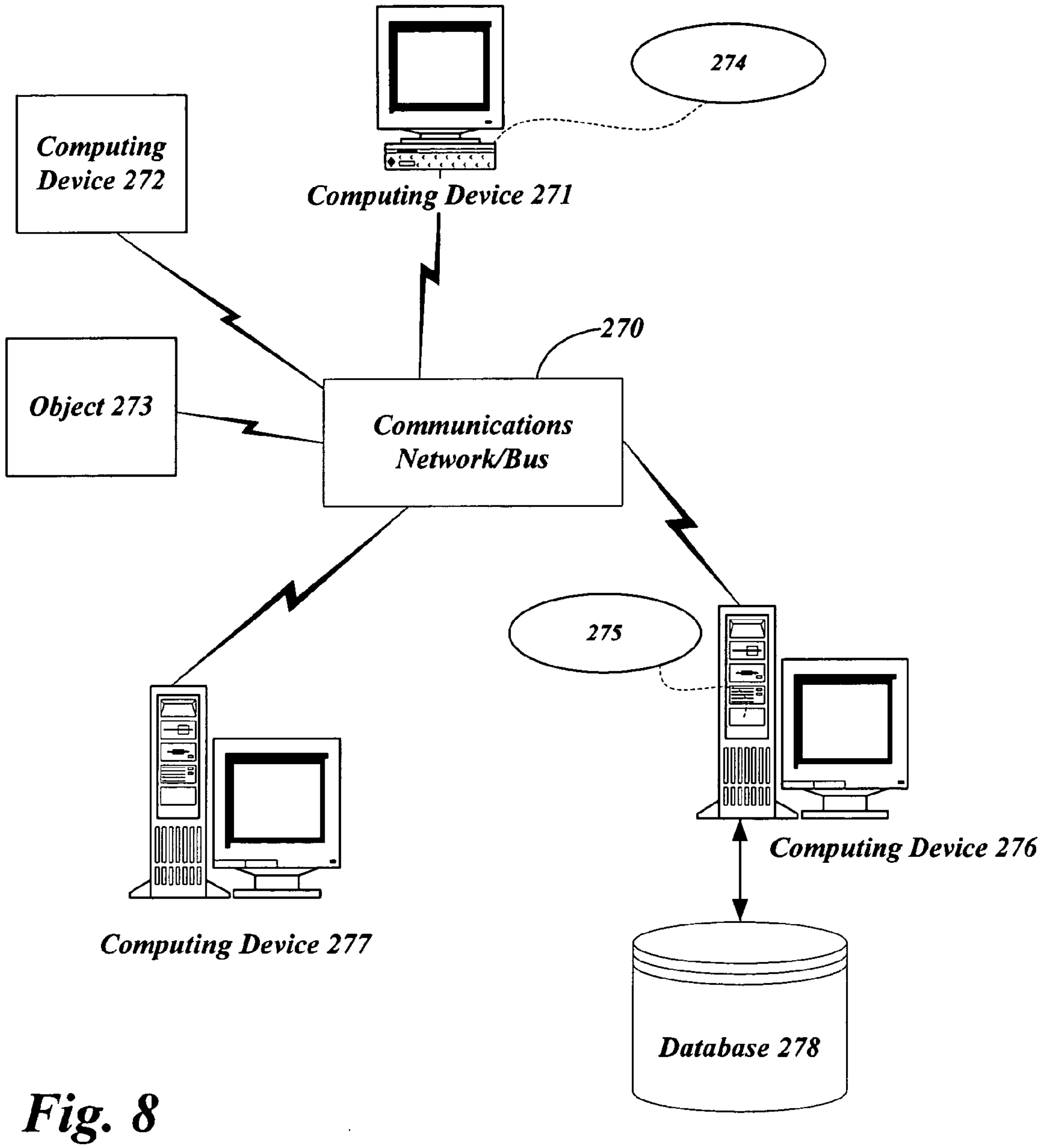
FIG. 8 illustrates an exemplary networked computing environment in which many computerized processes, including those of various aspects of the invention, may be implemented.

An exemplary networked computing environment is provided in FIG. 8. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 8 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 8, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 8, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 7 and the further diversification that can occur in computing in a network environment such as that of FIG. 8, the systems and methods provided herein cannot be construed as limited in any way to a particular computing architecture. Instead, the invention should not be limited to any single embodiment, but rather should be construed in breadth and scope in accordance with the appended claims.

What is claimed:

1. A method for enabling a software build for content of an interactive multimedia software application, the method comprising:

- creating at least one file according to a standardized file format containing metadata related to said content, the metadata comprising routing information, context information, and information regarding reading the content, wherein said metadata is that which is necessary to perform a software build of said content for a plurality of different interactive multimedia software applications that use the same said content;
- creating a plurality of copies of the at least one file;
- providing the plurality of copies of the at least one file to an integrated development environment;
- processing each copy of the at least one file through a respective content build pipeline of a plurality of content build pipelines, each content build pipeline comprising a merge transformer, a sound transformer, a texture compress transformer, and a level of detail (LOD) transformer for a respective gaming platform of a plurality of gaming platforms;
- processing each copy of the at least one file through a respective game engine transformer of a plurality of game engine transformers, thereby generating a plurality of content builds for the plurality of gaming platforms; and
- for each copy of the at least one file, using the integrated development environment to perform the software build of the content for the plurality of different interactive multimedia software applications.

2. The method of claim 1 wherein the build for content of an interactive multimedia software application puts the content into formats specific to each of the plurality of interactive multimedia software applications such that it can be accepted by each of the plurality of interactive multimedia software applications.

3. The method of claim 2 further comprising: transforming the content, using said metadata in the standardized file format related to said content, into at least one format which is optimized for at least one of the plurality of interactive multimedia software applications.

4. The method of claim 3 further comprising processing one copy of the at least one file through a preview content build pipeline of the plurality of content build pipelines, the preview content build pipeline comprising fewer than all of the merge transformer, the sound transformer, the texture compress transformer, and the level of detail (LOD) transformer for a respective gaming platform of a plurality of gaming platforms.

5. The method of claim 1 wherein the metadata contains additional information that enables the software build to override using a general version of a piece of said content to use a specific version of said piece of content based on the additional information.

6. The method of claim 1 wherein the file created according to the standardized file format capable of containing metadata related to said content contains metadata such that to perform the software content build there need not be any export process to export a file in a format native to a content creation tool to formats specific to each of the plurality of interactive multimedia software applications.

7. The method of claim 1 wherein the file created according to the standardized file format contains said metadata referring to binary content files, but does not directly contain the binary content files.

8. The method of claim 7 wherein the metadata is in XML format.

9. A computer-readable storage medium having stored thereon computer-readable instructions for enabling a software build for content of an interactive multimedia software application, said computer-readable instructions comprising instructions for:

- creating at least one file according to a standardized file format containing metadata related to said content, the metadata comprising routing information, context information, information regarding reading the content, and platform override information for overriding said content with a different content for a platform, wherein said metadata is that which is necessary to perform a software build of said content for a plurality of different interactive multimedia software applications that use the same said content;
- creating a plurality of copies of the at least one file;
- providing the plurality of copies of the at least one file to an integrated development environment;
- processing each copy of the at least one file through a respective content build pipeline of a plurality of content build pipelines, each content build pipeline comprising a merge transformer, a sound transformer, a texture compress transformer, and a level of detail (LOD) transformer for a respective gaming platform of a plurality of gaming platforms;
- processing each copy of the at least one file through a respective game engine transformer of a plurality of game engine transformers, thereby generating a plurality of content builds for the plurality of gaming platforms; and
- for each copy of the at least one file, using the integrated development environment to perform the software build of the content for the plurality of different interactive multimedia software applications.

10. The computer readable storage medium of claim 9 wherein the build for content of an interactive multimedia software application puts the content into formats specific to each of the plurality of interactive multimedia software applications such that it can be accepted by each of the plurality of interactive multimedia software applications.

11. The computer readable storage medium of claim 9 further comprising computer readable instructions for: transforming the content, using said metadata in the standardized file format related to said content, into at least one format which is optimized for at least one of the plurality of interactive multimedia software applications.

12. The computer readable storage medium of claim 10 further comprising computer readable instructions for processing one copy of the at least one file through a preview content build pipeline of the plurality of content build pipelines, the preview content build pipeline comprising fewer than all of the merge transformer, the sound transformer, the texture compress transformer, and the level of detail (LOD) transformer for a respective gaming platform of a plurality of gaming platforms.

13. A system for enabling a software build for content of an interactive multimedia software application, the system comprising:

a processor; and a memory in communication with the processor and storing processor-executable instructions that, when executed by the processor, cause the processor to create at least one file according to a standardized file format containing metadata related to said content of the interactive multimedia software application, the metadata comprising routing information, context information, information regarding reading the content, and platform override information for overriding said content with a different content for a platform, wherein said metadata is that which is necessary to perform a software build of said content for a plurality of different interactive multimedia software applications that use the same said content, create a plurality of copies of the at least one file, provide the at least one file to an integrated development environment, process each copy of the at least one file through a respective content build pipeline of a plurality of content build pipelines, each content build pipeline comprising a merge transformer, a sound transformer, a texture compress transformer, and a level of detail (LOD) transformer for a respective gaming platform of a plurality of gaming platforms, process each copy of the at least one file through a respective game engine transformer of a plurality of game engine transformers, thereby generating a plurality of content builds for the plurality of gaming platforms; and for each copy of the at least one file, use the integrated development environment to perform the software build of the content for the plurality of different interactive multimedia software applications.

14. The system of claim 13 wherein the build for content of an interactive multimedia software application puts the content into formats specific to each of the plurality of interactive multimedia software applications such that it can be accepted by each of the plurality of interactive multimedia software applications.

15. The system of claim 13 further comprising: means for transforming the content, using said metadata in the standardized file format related to said content, into at least one format which is optimized for at least one of the plurality of interactive multimedia software applications.

16. The system of claim 15 further comprising means for processing one copy of the at least one file through a preview content build pipeline of the plurality of content build pipelines, the preview content build pipeline comprising fewer than all of the merge transformer, the sound transformer, the texture compress transformer, and the level of detail (LOD) transformer for a respective gaming platform of a plurality of gaming platforms.

17. The system of claim 13 wherein the metadata contains additional information that enables the software build to override using a general version of a piece of said content to use a specific version of said piece of content based on the additional information.

18. The system of claim 13 wherein the file created according to the standardized file format capable of containing metadata related to said content contains metadata such that to perform the software content build there need not be any export process to export a file in a format native to a content creation tool to formats specific to each of the plurality of interactive multimedia software applications.

19. The system of claim 13 wherein the file created according to the standardized file format contains said metadata referring to binary content files, but does not directly contain the binary content files.

20. The system of claim 19 wherein the metadata is in XML format.

* * * * *